Nov. 24, 1964     K. L. SHELL     3,158,392
HOLDER FOR AUTOMOBILE TRUNK LIDS
Filed Oct. 15, 1962
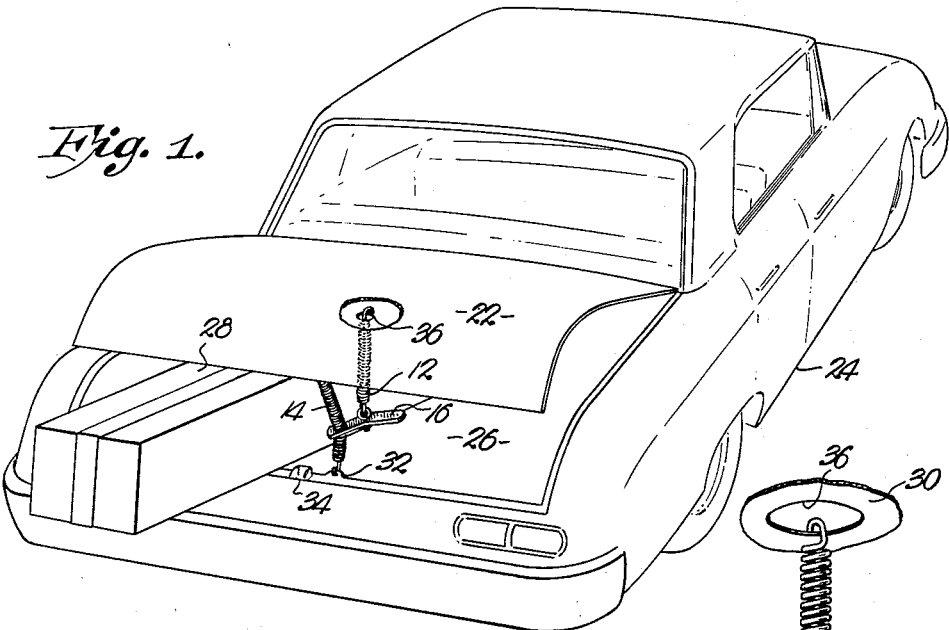
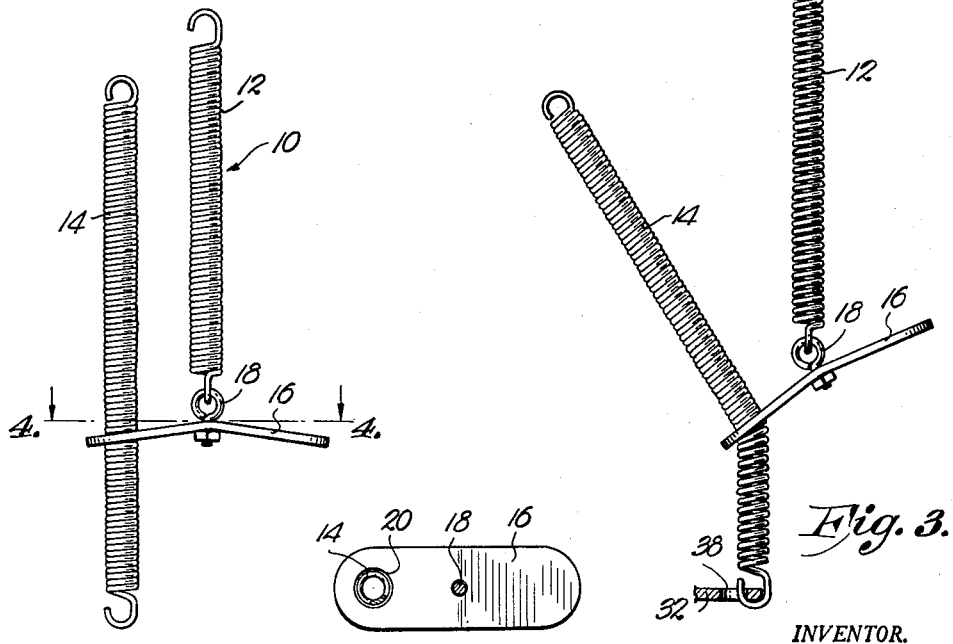
INVENTOR.
Kerry Lester Shell
BY 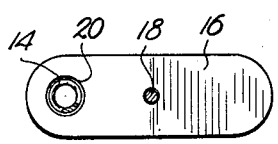
ATTORNEYS.

though of the present invention and illustrating the
United States Patent Office 3,158,392
Patented Nov. 24, 1964

3,158,392
HOLDER FOR AUTOMOBILE TRUNK LIDS
Kerry Lester Shell, Hopkins, Mo.
Filed Oct. 15, 1962, Ser. No. 230,349
4 Claims. (Cl. 292—288)

This invention relates to closure means, and more particularly, to structure for holding an automobile trunk lid downwardly when an object carried within the trunk and projecting outwardly therefrom prevents the complete closing of the trunk lid.

In numerous instances, articles carried within the trunk of an automobile prevent the complete closing of the trunk lid due to the irregular and large sizes and shapes of such articles. Generally, means is provided for holding the trunk lid down and such means includes rope, twine, string, wire or the like. Although such materials are adequate for certain situations, it is evident that the same are inadequate to prevent the slamming downwardly of the trunk lid onto the article carried by the automobile as the latter passes over bumps or the like and especially, when the trunk lid is permitted to move through a limited distance by failure to properly tighten the above-identified materials. Damage, therefore, may well be sustained by the trunk lid and the article carried within the trunk, or the rate of travel of the automobile is significantly reduced in order to prevent such damage to the trunk lid and article.

The present invention overcomes the disadvantages inherent in the use of the aforesaid materials by providing spring means for biasing the trunk lid of an automobile downwardly with a force which can be maintained substantially constant regardless of the size or shape of the article carried within the trunk and preventing the complete closing of the trunk lid.

It is, therefore, the primary object of the present invention to provide a spring having means thereon for increasing or decreasing the effective length thereof and utilized for holding the trunk lid of an automobile downwardly when an article is carried within the trunk and prevents the complete closing of the trunk lid, whereby articles of varying shapes and sizes may be carried within the trunk while at the same time a predetermined force may be maintained on the trunk lid for drawing the same toward the closed position thereof by adjusting the length of the spring by the means provided therefor.

Another object of the present invention is the provision of a pair of elongated springs interconnected by structure shiftable along the length of and releasably secured to one of the springs, whereby the effective length of the other spring may be varied so that the same will be subjected to a predetermined tension when the other spring is utilized for biasing the trunk lid of an automobile downwardly notwithstanding irregular shapes and sizes of articles carried within the trunk of the automobile.

Still another object of the present invention is the provision of a spring of the aforesaid character which may be readily affixed to trunk lids of substantially all makes and models of automobiles, whereby no modification or additional structure is required to utilize the spring, and the same may be affixed to the trunk lid and automobile with a minimum expenditure of time annd effort.

Other objects of the present invention will become apparent as the following specification progresses, reference being had to the accompanying drawing, wherein:

FIGURE 1 is a perspective view of an automobile carrying an article within the trunk thereof and illustrating the use of the present invention for holding the trunk lid downwardly when an article carried within the trunk prevents the complete closing of the trunk lid;

FIG. 2 is an elevational view of the means forming the subject of the present invention and illustrating the relative positions of the coil springs forming parts thereof before the apparatus is utilized for holding a trunk lid downwardly;

FIG. 3 is a view of the present invention illustrating the relative positions of the springs when the same are affixed to the trunk lid and automobile respectively; and FIG. 4 is a cross-sectional view taken along line 4—4 of FIG. 2.

The present invention provides means for holding the trunk lid of an automobile downwardly toward the closed position thereof when an article carried within the trunk of the automobile prevents the complete closing of the trunk lid. A pair of elongated coil springs is interconnected by a link having an opening therein receiving one of the coil springs and an eyelet spaced from the opening for coupling the link with the other of the springs. The link is movable along the length of the first spring so that the effective length of the other spring is varied to subject the other spring to a predetermined tension regardless of the position of the trunk lid relative to the automobile.

The apparatus forming the subject of the present invention is broadly denoted by the numeral 10 and is shown in its inoperative condition in FIG. 2. Apparatus 10 comprises a pair of elongated, resilient coil springs 12 and 14 having hooked ends permitting the same to be readily affixed to support structure. A link 16 interconnects springs 12 and 14, it being noted that an eyelet 18 is carried by link 16 for receiving one of the hooked ends of spring 12. Link 16 is provided with an opening 20 spaced from eyelet 18 for receiving spring 14 in the manner shown in FIGS. 2, 3 and 4. It is noted that the diameter of opening 20 is slightly greater than that of spring 14 so that link 16 is movable along the length of spring 14. Furthermore, it is to be noted that link 16 is slightly V-shaped in character and tends to converge to the point at which eyelet 18 is connected therewith.

Apparatus 10 is adapted to be operably coupled with the trunk lid 22 of an automobile 24 having a trunk area 26 for carrying an article 28 of a size and shape preventing the complete closing of trunk lid 22. Lid 22 is provided with a perforated, inner panel 30 and automobile 24 is provided with a perforated ear 32 adjacent the latch means 34 utilized for releasably holding lid 22 in the closed position.

Apparatus 10 is utilized by hooking the end of spring 12 opposed to eyelet 18 within an opening 36 in panel 30 in the manner shown in FIG. 3 and the correspondingly opposite end of spring 14 is hooked within an opening 38 in ear 32. Spring 12 is deformed or stretched in the manner shown in FIG. 3, and the portion of spring 14 between link 16 and ear 32 is also deformed or stretched, as is clear in FIG. 3. Link 16 is canted with respect to spring 14 when the latter is in the condition of FIG. 3 so that link 16 is effectively releasably secured to spring 14. Thus, relative movement of link 16 and spring 14 is precluded so long as the lower portion of spring 14 is under tension.

Link 16 is movable along spring 14 until springs 12 and 14 are deformed to a predetermined extent, depending upon the separation of lid 22 from its normally closed position. Link 16 is shifted along spring 14 until a moderate amount of tension is placed on spring 12 so that lid 22 will be effectively biased downwardly with a force precluding upward movement of lid 22 under normal operating conditions of automobile 24. If it is desired to increase the tension in spring 12, link 16 is moved toward ear 32. Conversely, if it is desired to decrease the tension of spring 12, link 16 is moved away from ear 32.

By virtue of the present invention, trunk lid 22 may be held downwardly by a force which may be maintained at the same value regardless of the size and shape of the article 28 carried within trunk area 26. Apparatus 10 effectively prevents the oscillation of trunk lid 22 during the normal operation of automobile 24 to thereby prevent damage to trunk lid 22 and article 28.

Having thus described the invention, what is claimed as new and desired to be secured by Letters Patent is:

1. Apparatus for biasing an automobile trunk lid downwardly when the same is maintained in an open position by an article between the lid and the automobile, said apparatus comprising:

an elongated spring adapted to be secured adjacent one end thereof to said trunk lid and to extend toward said automobile;

an elongated element adapted to be secured adjacent a first extremity thereof to said automobile, said element comprising a coil spring; and means movable along the length of said element and releasably secured thereto for interconnecting said element with said spring adjacent the opposite end of the latter whereby the effective length of said spring may be varied to permit articles of various shapes and sizes to be carried between the trunk lid and the automobile without subjecting said spring to excessive stresses.

2. Apparatus as set forth in claim 1, wherein said interconnecting means includes a link normally maintaining the longitudinal axes of said spring and said element in spaced, unaligned relationship.

3. Apparatus as set forth in claim 2, wherein said link is secured adjacent one end thereof to said spring and releasably secured adjacent the opposite end thereof to said element.

4. Apparatus as set forth in claim 2, wherein said link is shiftably mounted on said spring and provided with an element-receiving opening therein.

References Cited by the Examiner

UNITED STATES PATENTS

| | | | |
|---|---|---|---|
| 2,665,903 | 1/54 | Green | 267—73 |
| 2,919,946 | 1/60 | Miener | 292—288 |
| 2,976,000 | 3/61 | Gunderson | 248—204 |
| 3,011,818 | 12/61 | Matthiessen | 292—288 |

ALBERT H. KAMPE, *Primary Examiner.*

M. HENSON WOOD, JR., *Examiner.*